(12) United States Patent
Tsuchimoto (10) Patent No.: US 12,370,809 B2
(45) Date of Patent: Jul. 29, 2025

(54) PRINTER

(71) Applicant: TOSHIBA TEC KABUSHIKI KAISHA, Tokyo (JP)

(72) Inventor: Hiroshi Tsuchimoto, Numazu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 154 days.

(21) Appl. No.: 18/470,466

(22) Filed: Sep. 20, 2023

(65) Prior Publication Data

US 2025/0091362 A1    Mar. 20, 2025

(51) Int. Cl.
*B41J 2/35* (2006.01)
*B41J 29/393* (2006.01)
*G06K 15/02* (2006.01)

(52) U.S. Cl.
CPC ............... *B41J 2/35* (2013.01); *B41J 29/393* (2013.01); *G06K 15/028* (2013.01)

(58) Field of Classification Search
CPC ........ B41J 29/393; B41J 2/0452; B41J 2/155; B41J 2/0457; B41J 29/38; G06K 15/028
See application file for complete search history.

(56) References Cited

U.S. PATENT DOCUMENTS

2001/0055057 A1* 12/2001 Sato .................. B41J 2/355
                                                       347/194
2017/0282592 A1* 10/2017 Kubo .................. B41J 2/3551

FOREIGN PATENT DOCUMENTS

JP          2000-211194          8/2000

* cited by examiner

*Primary Examiner* — Thinh H Nguyen
(74) *Attorney, Agent, or Firm* — Amin, Turocy & Watson, LLP (57) ABSTRACT

A printer driven by power of a battery, the printer including a thermal head including a plurality of heating elements arranged along a direction perpendicular to a conveying direction, a drive unit to supply power to the thermal head to drive the thermal head, and a processor to control driving and perform printing on the recording medium according to printing data, in which the processor calculates, based on a state of its own printer, a printing cycle related to printing of each line for the line configuring the printing data and an energization time for supplying power to the thermal head within the printing cycle, adjusts the energization time according to a characteristic difference between an internal resistance of the reference battery and an internal resistance of the battery, and prints for one line by supplying power to the drive unit during the energization time after adjustment.

20 Claims, 6 Drawing Sheets

| MANUFACTURER NAME | MODEL NAME | MODEL NUMBER | COEFFICIENT |
|---|---|---|---|
| MANUFACTURER A | MODEL B | 01 | 1 |
| MANUFACTURER A | MODEL B | 02 | $\alpha$ |

PRINTER

FIELD

Embodiments described herein relate generally to a printer, a method for a battery powered printer, and a battery powered thermal printer.

BACKGROUND

In related arts, a thermal printer driven by a battery exists. To maximize a power supply capability of the battery, such a thermal printer determines the time for energizing a thermal head and a printing cycle based on conditions such as battery voltage, ambient temperature, thermal head temperature, and printing density set value designated by a user.

Meanwhile, in the thermal printer described above, a battery currently in use (hereinafter also referred to as a conventional battery) is replaced with another battery (hereinafter also referred to as an alternative battery) for reasons such as discontinuation of battery production.

When replacing the conventional battery with the alternative battery, even after replacement, the same usage and usability as before replacement can be maintained by setting a printing speed equivalent to that when using the conventional battery.

However, if the conventional battery is replaced with the alternative battery, difference in printing quality may appear due to difference in internal resistance between both batteries. For example, when replacing with the alternative battery having lower internal resistance than the conventional battery, the amount of power supplied per unit time is increased compared to the conventional battery, and thus there is a possibility that difference in printing quality may occur, such as printing with thicker printing density.

DETAILED DESCRIPTION

In general, according to one embodiment, there is provided a printer driven by power of a battery, the printer including a thermal head configured to include a plurality of heating elements arranged along a direction perpendicular to a conveying direction of a recording medium, a drive unit configured to supply power from the battery to the thermal head to drive the thermal head, and a processor configured to control driving of the drive unit and print on the recording medium according to printing data, in which the processor is configured to calculate, based on a state of its own printer, a printing cycle related to printing of each line for the line configuring the printing data and an energization time for supplying power to the thermal head within the printing cycle when using a reference battery as a reference, adjust the energization time according to a characteristic difference between an internal resistance of the reference battery and an internal resistance of the battery, and print for one line by supplying power to the drive unit during the energization time after adjustment in the printing cycle.

Hereinafter, embodiments will be described in detail with reference to the accompanying drawings. The printer of an exemplary embodiment is not limited by the embodiments described below.

Figure 1:
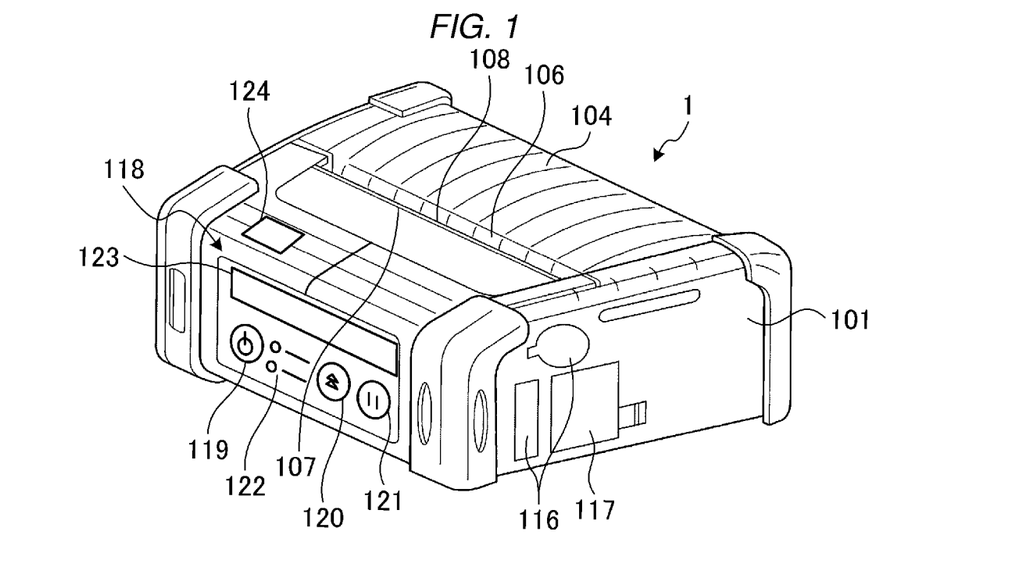
FIG. 1 is a perspective view illustrating an example of an appearance of a printer according to an embodiment.
Figure 2:
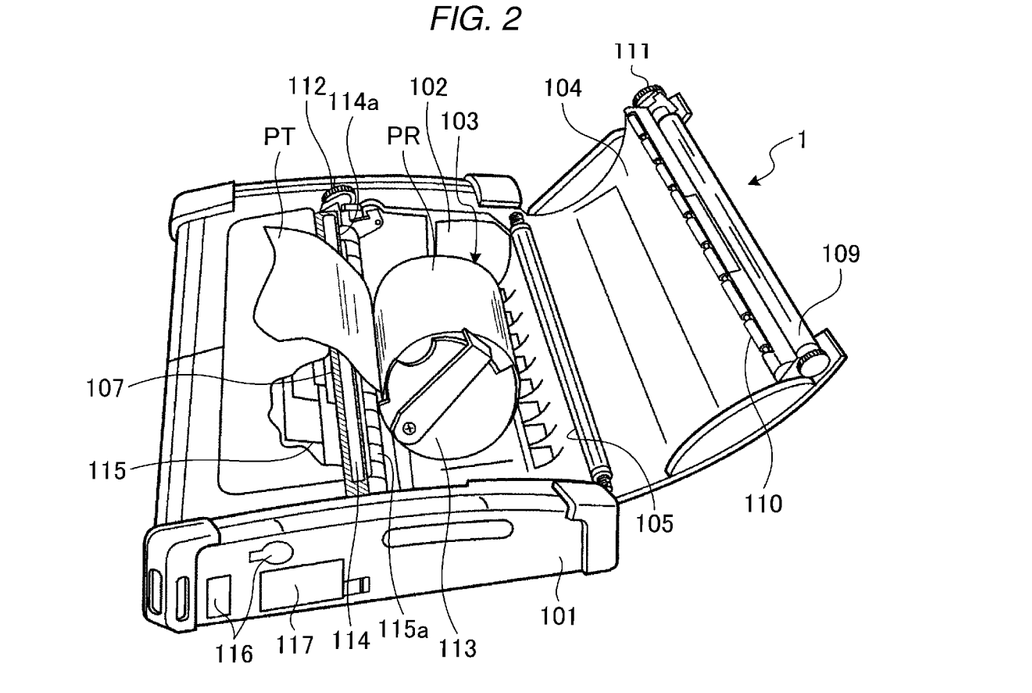
FIG. 2 is a perspective view illustrating a state in which a cover of the printer illustrated in FIG. 1 is opened.

FIG. 1 is a perspective view illustrating an example of an appearance of a printer according to this embodiment. FIG. 2 is a perspective view illustrating a state in which a cover of the printer illustrated in FIG. 1 is opened.

A printer 1 includes a rectangular parallelepiped shape housing 101. The housing 101 has an internal structure for storing a paper roll PR wound with paper PT, which is a medium to be printed, and has an opening 102 formed on an upper surface thereof so that the paper roll PR can be stored in the housing 101. Inside the opening 102, a paper storage unit 103 in which the paper roll PR can be freely attachably and detachably stored is formed. Here, the paper PT is, for example, thermal paper or label paper in which a plurality of labels formed of thermal paper are attached to a mount of non-thermal paper.

The opening 102 is opened and closed by opening and closing a cover 104 that is rotatably provided. The cover 104 is rotatably attached to a back side 105 of the housing 101 forming one side of the opening 102. A paper discharge port 108 for picking up the printed paper PT is formed between an outer side 106, which is the tip of the cover 104, and a front side 107, which is one side of the opening 102, if the cover 104 is closed.

The cover 104 includes a platen roller 109, a paper pressing roller 110 and a driven gear 111. The platen roller 109 is provided at a position where the platen roller 109 is in contact with a thermal head 114 inside the housing 101 if the cover 104 is closed. The paper pressing roller 110 is provided in the vicinity of the platen roller 109 and comes into contact with a head cover 115a if the cover 104 is closed. Both the platen roller 109 and the paper pressing roller 110 are freely rotatable around the width direction of the printer 1 as a rotation axis.

At one end side of the platen roller 109, the driven gear 111 that rotates integrally with the platen roller 109 is provided. A driving gear 112 is provided at a position corresponding to the driven gear 111 inside the housing 101. The driven gear 111 meshes with the driving gear 112 if the cover 104 is closed. The driving gear 112 rotates using a stepping motor 126 (see FIGS. 3 and 4) as a driving source. The driven gear 111 is driven by the driving gear 112 to rotationally drive the platen roller 109 connected to the driven gear 111. In the embodiment, the driven gear 111 and the driving gear 112 configure a transmission 128 (see FIG. 4), which will be described later.

The paper roll PR is stored in the paper storage unit 103 with a roll axis facing the width direction of the printer 1. The paper PT on the paper roll PR is pulled out by the platen roller 109 and conveyed in the direction of the paper discharge port 108 (sub-scanning direction). In the embodiment, the paper roll PR is attachably and detachably stored between a pair of guide fences 113 inside the paper storage unit 103.

The thermal head 114 is disposed inside the housing 101 at a position opposed to the platen roller 109 of the cover 104. A head bracket 115 is fixed to the housing 101 and urges the thermal head 114 upward on the back side of the printer 1. The head cover 115a is mounted on the housing 101 as needed. The head cover 115a urges the thermal head 114 to prevent vibration.

The thermal head 114 includes a plurality of heating elements 1141 arranged in a line in a main scanning direction perpendicular to the sub-scanning direction. Each heating element 1141 is a heating element that generates heat by energization and each heating element corresponds to one dot of a pixel. The thermal head 114 heats the paper PT by causing the heating element 1141 to generate heat based on energization control of a head drive unit 132 (see FIG. 4), and prints for each line.

In the vicinity of the thermal head 114, a temperature sensor 127 (see FIGS. 3 and 4) for detecting the environmental temperature around the thermal head 114, that is, the temperature inside the printer 1 (hereinafter also referred to as ambient temperature) is provided. The thermal head 114 is assumed to be provided with a temperature sensor (not illustrated) for detecting the temperature of the thermal head 114 itself (hereinafter also referred to as thermal head temperature).

On one side of the housing 101, a connection connector unit 116 and a battery storage unit 117 are provided. The connection connector unit 116 is a connection terminal for connecting with an external device. The battery storage unit 117 is a space for storing a battery BT for driving (see FIG. 4). The battery BT stored in the battery storage unit 117 is connected to a battery connector (not illustrated). The battery storage unit 117 and/or the battery connector (not illustrated) is an example of a connection unit to which the battery BT can be attachably and detachably connected.

The housing 101 includes a display and operation unit 118. The display and operation unit 118 includes a power switch 119, a paper feed button 120 for the user to instruct paper feed or the like, a pause button 121 for the user to instruct to pause paper feed or the like, an indicator 122 for informing the user of a state of the printer 1, a display unit 123, and a communication window 124 for infrared communication. Here, the display unit 123 is a display device such as a liquid crystal display (LCD).

The printer 1 transmits and receives various data to and from an external device connected via the communication window 124 and the connection connector unit 116. For example, through the data transmission and reception, the printer 1 receives printing data to be printed from the external device, stores the printing data in the storage unit 131, a RAM 1373 (see FIG. 4), or the like, and prints the printing data. Here, the external device is, for example, an information processing device such as a personal computer (PC), a POS terminal, a mobile terminal, or a handy terminal.

Next, referring to FIG. 3, a printing mechanism of the printer 1 will be described. Here, FIG. 3 is a diagram schematically illustrating the printing mechanism of the printer 1.

Figure 3:
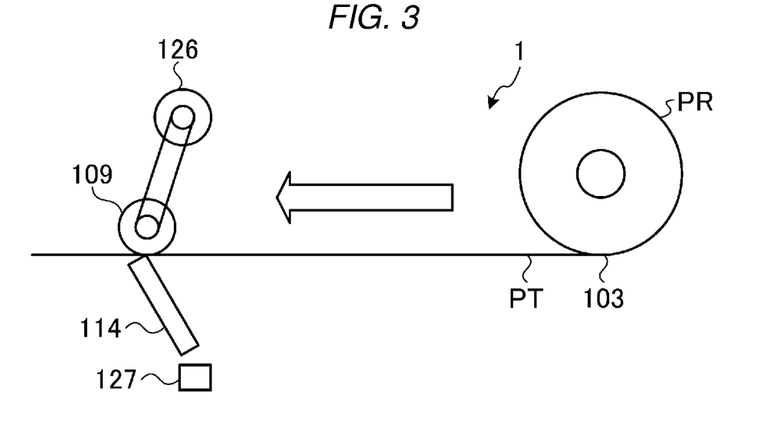
FIG. 3 is a diagram schematically illustrating a printing mechanism of the printer.

As illustrated in FIG. 3, in the printer 1, if the paper roll PR is stored in the paper storage unit 103, the paper PT is pulled out, and the cover 104 is closed, the pulled out paper PT is sandwiched between the platen roller 109 and the thermal head 114.

If the paper PT is sandwiched between the platen roller 109 and the thermal head 114, the stepping motor 126 rotationally drives the platen roller 109 via the transmission 128 and the like under the control of a control unit 137 (see FIG. 4), which will be described later. Accordingly, the paper PT is conveyed in the sub-scanning direction (arrow direction in the drawing) from the paper roll PR to the paper discharge port 108 via the thermal head 114. The thermal head 114 prints on the paper PT conveyed in the sub-scanning direction by causing the heating element 1141 to generate heat based on power supplied from the head drive unit 132, which will be described later.

Figure 4:
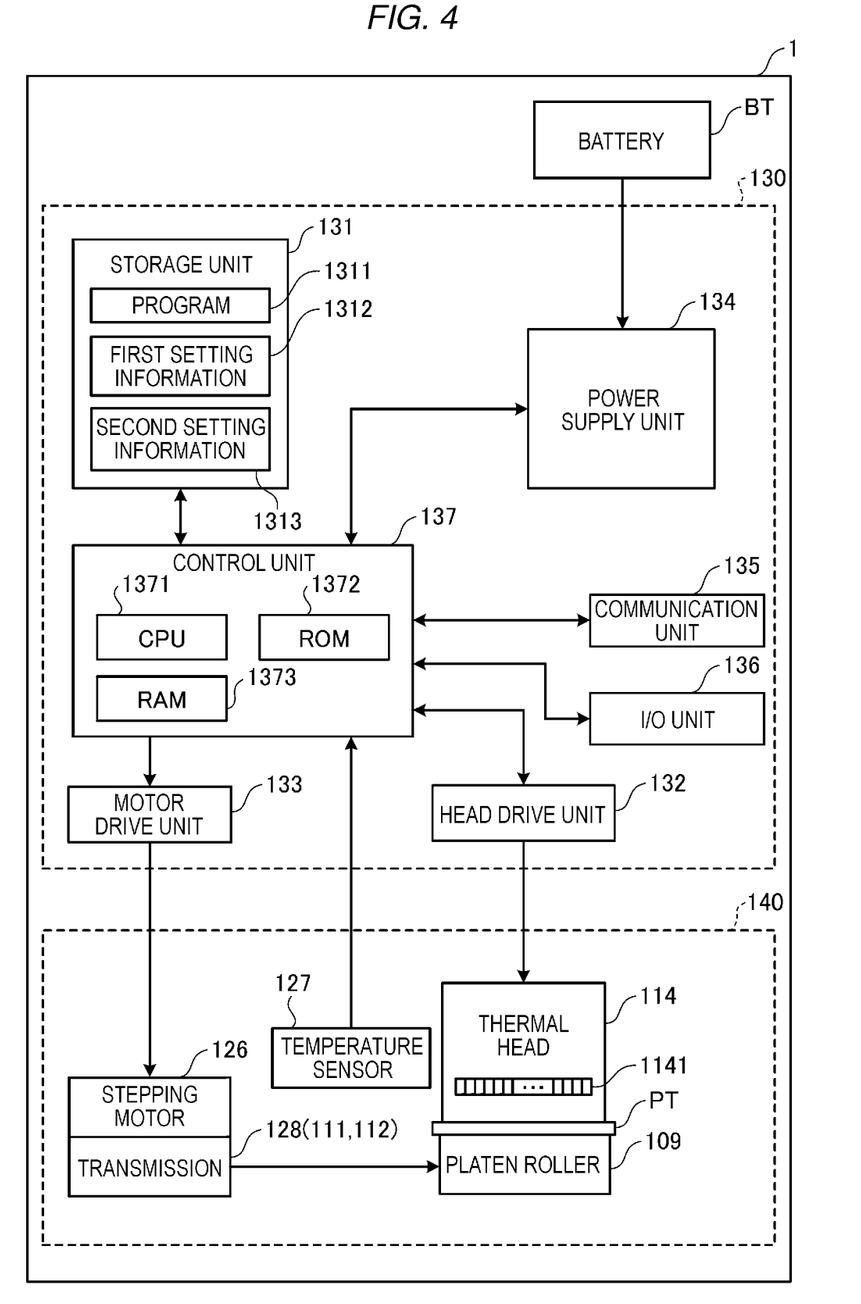
FIG. 4 is a diagram illustrating an example of a hardware configuration of the printer.

Next, a hardware configuration of the printer 1 will be described. FIG. 4 is a diagram illustrating an example of the hardware configuration of the printer 1. As illustrated in FIG. 4, the printer 1 includes, as a control system 130, the storage unit 131, the head drive unit 132, a motor drive unit 133, a power supply unit 134, a communication unit 135, an I/O unit 136, and the control unit 137. The printer 1 also includes, as a printing mechanism 140, the platen roller 109, the thermal head 114 (heating elements 1141), the stepping motor 126, the temperature sensor 127, and the transmission 128 (driven gear 111, driving gear 112) described above.

The storage unit 131 is a storage medium such as a flash memory. The storage unit 131 stores various kinds of setting information related to printing control, in addition to various programs 1311 related to the control of the printer 1.

For example, the storage unit 131 stores first setting information 1312 in which relational formulas (formula (1) to (5) described later) and the like related to derivation of the printing cycle and energization time of the thermal head 114 are set. For example, the storage unit 131 stores second setting information 1313 in which an adjustment value (coefficient and the like) related to adjustment of the energization time is set for each type of the battery BT (hereinafter also referred to as battery type).

Figure 5:
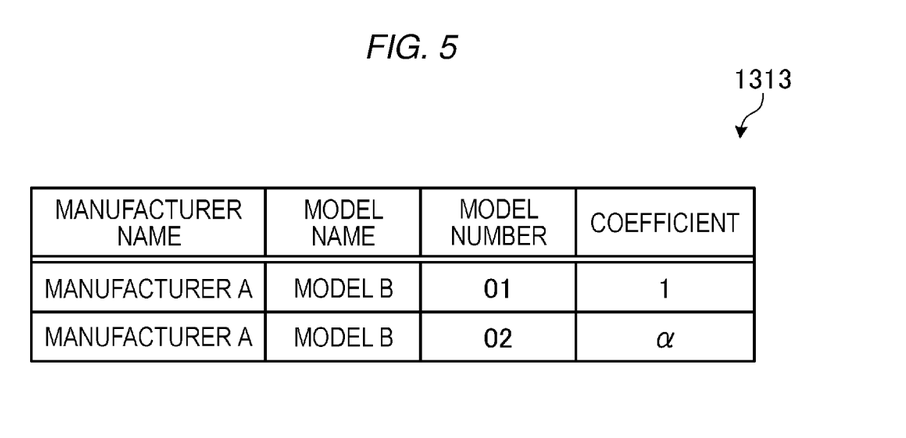
FIG. 5 is a diagram illustrating an example of a data configuration of second setting information according to the embodiment.

FIG. 5 is a diagram illustrating an example of a data configuration of the second setting information 1313. As illustrated in FIG. 5, the second setting information 1313 stores a manufacturer name, a model name, a model number, and the like representing the battery type in correlation with the coefficient.

Here, the coefficient is set to a value according to the characteristics of the battery BT corresponding to the battery type. Specifically, the coefficient is set to a value corresponding to a characteristic difference between the internal resistance of the battery BT of the reference battery type (hereinafter also referred to as a reference battery) and the internal resistance of the battery BT of another battery type. The internal resistance of the reference battery is assumed to be the same as or greater than the internal resistance of the battery BT of another battery type.

More specifically, a value corresponding to a ratio of the amount of power supplied from the reference battery per unit time and the amount of power supplied from the battery BT of another battery type per unit time is set as the coefficient.

As an example, with the amount of power supplied to the thermal head 114 per unit time (applied power×unit time) when using the reference battery as a reference amount of power, a value, which is obtained by dividing the time required to reach the reference amount of power with the applied voltage of the battery of another battery type by the unit time, is preferably set, as the coefficient.

In FIG. 5, an example in which the battery BT having the model number "01" is used as the reference battery and the coefficient is "1" is illustrated. The coefficient of the battery BT whose model number is "02" is represented by a. In the embodiment, the reference battery having the model number "01" corresponds to a conventional battery described later, and the battery BT having the model number "02" corresponds to an alternative battery described later.

The number of battery types registered in the second setting information 1313 is not limited to two, and three or more battery types may be registered. In FIG. 5, the battery BT having the model number "01" is used as the reference battery, but is not limited thereto. The coefficient according to the internal resistance of the reference battery may be set for each of the battery types registered in the second setting information 1313 by virtually setting the reference battery.

The head drive unit 132 is an example of a drive unit. The head drive unit 132 supplies power to the thermal head 114 to cause the heating element 1141 to generate heat corresponding to the printing data under the control of the control unit 137. Here, the power supplied is proportional to the number of heating elements 1141 that actually print.

The motor drive unit 133 outputs a drive pulse signal to the stepping motor 126 under the control of the control unit 137 to control a conveyance speed of the paper PT in the sub-scanning direction of the thermal head 114.

The power supply unit 134 controls ON and OFF of power output (supplied) from the battery BT of the battery storage unit 117 according to the ON and OFF operation of the power switch 119 of the display and operation unit 118. Specifically, the power supply unit 134 supplies the power of the battery BT to each unit of the printer 1 if the power switch 119 is turned ON. The power supply unit 134 detects a voltage level of the battery BT stored in the battery storage unit 117 (hereinafter also referred to as battery voltage) and notifies the control unit 137 of the detection result. In FIG. 4, a control line between the power supply unit 134 and the control unit 137 are illustrated, and a power supply line between the power supply unit 134 and each unit of the printer 1 are omitted.

The communication unit 135 is various communication interfaces. The communication unit 135 transmits and receives various data to and from an external device connected via the connection connector unit 116, the communication window 124, and the like. For example, the communication unit 135 receives printing data transmitted from an external device and stores the printing data in the storage unit 131. The communication interface is, for example, infrared communication such as IrDA, USB, wireless local area network (LAN), RS-232C, Bluetooth (registered trademark), and the like.

The I/O unit 136 is connected to devices such as the power switch 119, the paper feed button 120, the pause button 121, the indicator 122, and the display unit 123 of the display and operation unit 118, and controls input and output of signals or information via the devices.

The control unit 137 is a computer including a central processing unit (CPU) 1371, a read only memory (ROM) 1372, the random access memory (RAM) 1373, and the like. The CPU 1371 is an example of a processor and is implemented by one or more processing circuits, for example. The ROM 1372 stores various programs such as a program executed by the CPU 1371 and various data.

The RAM 1373 is used as a work area for the CPU 1371, and loads various programs and data stored in the ROM 1372 and the storage unit 131. The RAM 1373 stores printing dot data generated based on printing data received from an external device. The printing dot data is data such as data in a bitmap format in which images such as characters and graphics are represented by dots. The printing dot data includes a plurality of pieces of printing dot data for each line. That is, the printing dot data can be rephrased as an aggregate of printing dot data for each line.

The control unit 137 executes various control processes of the printer 1 by the CPU 1371 operating according to the program 1311 stored in the ROM 1372 and storage unit 131 and loaded in the RAM 1373. For example, the control unit 137 calculates the energization time of the thermal head 114 for each line based on various printing conditions determined according to the printing dot data, in addition to the battery voltage detected by the power supply unit 134, the environmental temperature detected by the temperature sensor 127, the thermal head temperature, and the like. Here, the energization time means the time during which the thermal head 114 is energized within a printing cycle determined according to the specifications of the printer 1 and the like. The printing cycle means a period of time for printing one line. Hereinafter, the remaining time excluding the energization time from the printing cycle is also referred to as energization break time.

Then, the control unit 137 controls the head drive unit 132 and the motor drive unit 133, and energizes the thermal head 114 for each line at the calculated energization time and printing cycle, thereby comprehensively controlling a printing operation by the printing mechanism 140. The energization time and the printing cycle will be described later.

Meanwhile, in the printer 1, as described above, the battery BT is configured to be freely detachable and attachable. Therefore, it is possible to replace a currently used battery BT (hereinafter also referred to as conventional battery BTa) with another battery BT having different characteristics (hereinafter also referred to as alternative battery BTb), for example, for reasons such as discontinuation of production.

When replacing the conventional battery BTa with the alternative battery BTb, even after replacement, the same usage and usability as before replacement can be maintained by setting a printing speed equal to that when using the conventional battery BTa.

However, if the conventional battery BTa is replaced with the alternative battery BTb, there is a possibility that difference in printing quality will appear due to difference in internal resistance between both batteries. Specifically, if the battery is replaced with then alternative battery BTb that has a lower internal resistance than the conventional battery BTa, the amount of power supplied per unit time is increased compared to the conventional battery BTa, and thus there is a possibility that difference in printing quality may occur, such as printing with thicker printing density.

Therefore, in the printer 1 of the embodiment, in the functional configuration described later, even if the battery is replaced with the alternative battery BTb, a printing speed similar to that of the conventional battery BTa is maintained and compatibility in printing quality is ensured.

Figure 6:
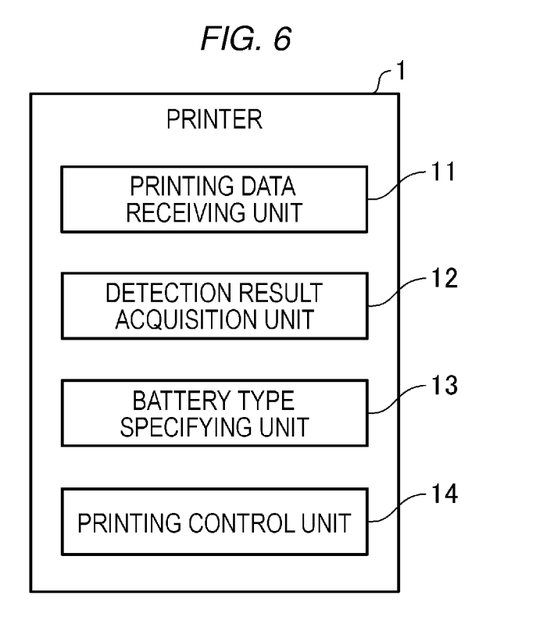
FIG. 6 is a diagram illustrating an example of a functional configuration of the printer.

The functional configuration of the printer 1 will be described below. FIG. 6 is a diagram illustrating an example of the functional configuration of the printer 1.

As illustrated in FIG. 6, the printer 1 includes a printing data receiving unit 11, a detection result acquisition unit 12, a battery type specifying unit 13, and a printing control unit 14 as functional configurations. Some or all of the functional configurations may be a software configuration implemented on the RAM 1373 by the cooperation of the CPU 1371 and the programs stored in the ROM 1372 and storage unit 131. Some or all of the functional units may be a hardware configuration implemented by one or more processing circuits designed to implement each function.

The printing data receiving unit 11 receives printing data transmitted from an external device via the communication unit 135. The printing data receiving unit 11 generates printing dot data that can be printed by the thermal head 114 based on the received printing data, and stores the printing dot data in the RAM 1373 or the like.

The detection result acquisition unit 12 acquires detection values detected (measured) by various sensors provided in the printer 1. For example, the detection result acquisition unit 12 acquires the ambient temperature detected by the temperature sensor 127. For example, the detection result acquisition unit 12 acquires the battery voltage detected by the power supply unit 134. For example, the detection result acquisition unit 12 acquires the temperature detected by the thermal head 114 (thermal head temperature).

The battery type specifying unit 13 specifies the type of the battery BT (hereinafter also referred to as battery type) stored in the battery storage unit 117.

For example, if the battery type of the battery BT stored in the battery housing unit 117 can be recognized via the power supply unit 134 or the like, the battery type specifying unit 13 specifies the recognized battery type as the battery type of the battery BT stored in the battery storage unit 117. Here, for example, the power supply unit 134 may be configured to read the battery type of the battery BT from a storage medium held by the battery BT.

For example, the battery type specifying unit 13 receives the designation of the battery type of the battery BT stored in the battery storage unit 117 from a user, and specifies the designated battery type as the battery type of the battery BT stored in the battery storage unit 117. Here, based on the second setting information 1313, the battery type specifying unit 13 may cause the display unit 123 to display a selection screen representing battery types that are candidates for selection. Specifically, the battery type specifying unit 13 causes the display unit 123 to display each battery type (manufacturer name, model name, and model number) registered in the second setting information 1313 in a selectable state, and waits for a user's selection operation. If a particular battery type is selected by the user, the battery type specifying unit 13 specifies the selected battery type as the battery type of the battery BT stored in battery storage unit 117. As an example, if the conventional battery BTa is replaced with the alternative battery BTb, the user selects the battery type of model number "02".

If the battery type is specified, the battery type specifying unit 13 stores information indicating the battery type (hereinafter also referred to as battery information) in the storage unit 131 or the like. For example, the battery information may be flag information or the like correlated with a specified battery type among the battery types registered in the second setting information 1313. The printing control unit 14, which will be described later, reads the battery type indicated in the battery information as the battery type of the battery BT in use.

The timing at which the battery type specifying unit 13 specifies the battery type is not particularly determined. For example, the battery type specifying unit 13 may specify the battery type each time the printer 1 is started up. For example, the battery type specifying unit 13 may specify the battery type according to an instruction from the user.

The printing control unit 14 controls the head drive unit 132 and the motor drive unit 133 to print characters and images based on the printing data on the paper PT. Specifically, the printing control unit 14 controls the energization to the thermal head 114 in synchronization with the conveyance of the paper PT, thereby causing the heating elements 1141 corresponding to the printing dot data to generate heat and causing characters and images based on the printing data to be printed for each line.

Here, the printing control unit 14 determines the energization time to the thermal head 114 for each line based on various conditions determined according to the state of the printer 1 and printing dot data (hereinafter also referred to as printing data).

For example, the printing control unit 14 determines (calculates) an energization time $T_{ON}$ based on the following formula (1).

$$T_{ON} = f(\text{battery time, ambient temperature, thermal head temperature, printing density adjustment value, number of dots per line, ambient energized dot pattern}) \quad (1)$$

Here, f is a predetermined function for deriving the energization time with the elements in parentheses as parameters. Among the parameters of the function f, the battery time, the ambient temperature, and the thermal head temperature are parameters representing the state of the printer 1 and correspond to various detection results obtained by the detection result acquisition unit 12. The printing density adjustment value, the number of dots per line, and the ambient energized dot pattern are parameters determined according to the printing data.

The printing density adjustment value is a parameter corresponding to an appearance position of the printing dot data in one line, and the amount of energization is adjusted so that a predetermined printing density is obtained according to the appearance position. The number of dots per line is a parameter corresponding to the number of appearances of printing dot data in one line, and the amount of energization is adjusted according to the number of appearances. The ambient energized dot pattern is a parameter corresponding to the pattern of the printing dot data of the line immediately before, that is, a thermal history of the printing dot data printed immediately before, and the amount of energization is adjusted according to the surrounding energized dot pattern.

The parameter for deriving the energization time $T_{ON}$ is not limited to the example of the above formula (1). For example, the parameter for deriving the energization time $T_{ON}$ may be obtained by omitting any parameter from the above formula (1), or may be obtained by adding another parameter.

Next, the printing control unit 14 determines (calculates) an energization break time $T_{OFF}$ for each line based on the following formula (2).

$$T_{OFF} = f(\text{printer internal processing time}) \quad (2)$$

Here, f is a predetermined function for deriving the energization break time with the element in parentheses as the parameter. The printer internal processing time may be a fixed value determined according to the specifications of the printer 1, for example, or a dynamic value determined according to the number of appearances of printing dot data, the number of lines, and the like.

Next, the printing control unit 14 determines (calculates) a printing cycle $T_{CYC}$ for one line by adding the energization time $T_{ON}$ and the energization break time Torr using the following formula (3).

$$T_{CYC} = T_{ON} + T_{OFF} \quad (3)$$

Subsequently, the printing control unit 14 adjusts the energization time $T_{ON}$ based on the battery type specified by the battery type specifying unit 13, thereby adjusting a ratio between $T_{ON}$ and Torr within the printing cycle $T_{CYC}$.

Specifically, based on the second setting information 1313 and the battery type set in the battery information, the printing control unit 14 determines (calculates) the energization time $T_{ON(NEW)}$ after adjustment by using the following formula (4).

$$T_{ON(NEW)} = C \times T_{ON} \quad (4)$$

Here, a coefficient corresponding to the battery type is set for C.

For example, if the battery type in the battery information indicates the model number "0", that is, the conventional battery BTa, the printing control unit 14 sets the coefficient "1" of the model number "0" registered in the second setting information 1313 to C in the above formula (4), and calculates the energization time $T_{ON(NEW)}$ after adjustment. Here, $T_{ON(NEW)}$ is same as $T_{ON}$. That is, it can be said that the above formulas (1) to (3) are designed based on the conventional battery BTa (or reference battery).

For example, if the battery type in the battery information indicates the model number "1", that is, the alternative battery BTb, the printing control unit 14 sets the coefficient "a" of the model number "1" registered in the second setting information 1313 to C in the above formula (4), and calculates the energization time $T_{ON(NEW)}$ after adjustment.

Next, the printing control unit 14 determines (calculates) the energization break time $T_{OFF(NEW)}$ after adjustment using the following formula (5).

$$T_{OFF(NEW)} = T_{CYC} - T_{ON(NEW)} \quad (5)$$

Here, the relationship between the energization time $T_{ON}$ and the energization time $T_{ON(NEW)}$ if the battery BT in use is the alternative battery BTb will be described with reference to FIGS. 7 and 8.

Figure 7:
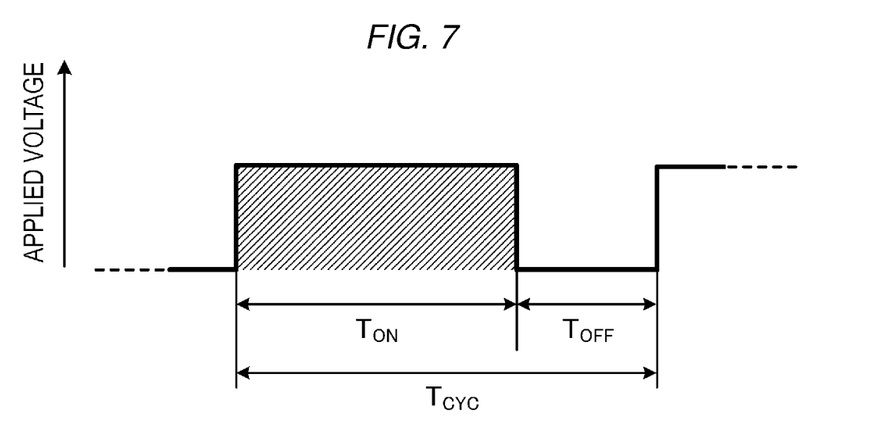
FIG. 7 is a timing chart illustrating an example of a printing cycle including energization time before adjustment.

FIG. 7 is a timing chart illustrating an example of the printing cycle $T_{CYC}$ including the energization time $T_{ON}$ before adjustment. FIG. 8 is a timing chart illustrating an example of the printing cycle $T_{CYC}$ including the energization time $T_{ON(NEW)}$ after adjustment. FIG. 8 illustrates a timing chart when using the alternative battery BTb having a lower internal resistance than the conventional battery BTa.

Figure 8:
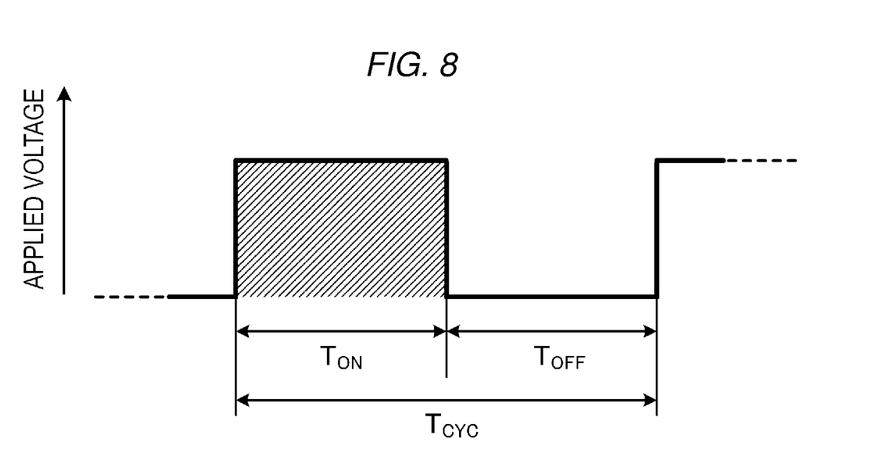
FIG. 8 is a timing chart illustrating an example of the printing cycle including energization time after adjustment.

In FIGS. 7 and 8, the vertical axis indicates the applied voltage to the thermal head 114, and the horizontal axis indicates the time axis. Here, the printing cycle $T_{CYC}$ is the same before and after adjustment.

If the conventional battery BTa and the alternative battery BTb have the same battery voltage, the alternative battery BTb having lower internal resistance will supply higher power to the thermal head 114. Therefore, the amount of power supplied per unit time by the alternative battery BTb is greater than that by the conventional battery BTa. Here, if power is supplied from the alternative battery BTb to the thermal head 114 using the energization time $T_{ON}$ determined based on the conventional battery BTa, a larger amount of power is supplied than when the conventional battery BTa is used, and a deviation in printing quality such as an increase in printing density occurs.

Therefore, in the embodiment, the energization time $T_{ON(NEW)}$ when using the alternative battery BTb is derived by adjusting the energization time $T_{ON}$ based on the above formula (4). As described above, the coefficient α used to derive the energization time $T_{ON(NEW)}$ is a value obtained based on the amount of power per unit time if the conventional battery BTa is used, by dividing the time required to reach the same amount of power with the power of the alternative battery BTb by the unit time of the reference battery. Therefore, the amount of power if power is supplied during the energization time $T_{ON(NEW)}$ using the alternative battery BTb (corresponding to the hatched area in FIG. 8) is approximately equal to the amount of power supplied during the energization time $T_{ON}$ using the conventional battery BTa (corresponding to the hatched area in FIG. 7).

Thus, even if the conventional battery BTa is replaced with the alternative battery BTb, the printing control unit 14 can maintain the printing cycle $T_{CYC}$ per line and ensure the compatibility of printing quality. Since the printing control unit 14 can calculate the energization time $T_{ON(NEW)}$ of the alternative battery BTb based on the relational formulas (formulas (1) to (3)) prepared for the conventional battery BTa (or reference battery), compatibility in printing quality can be ensured relatively easily.

Figure 9:
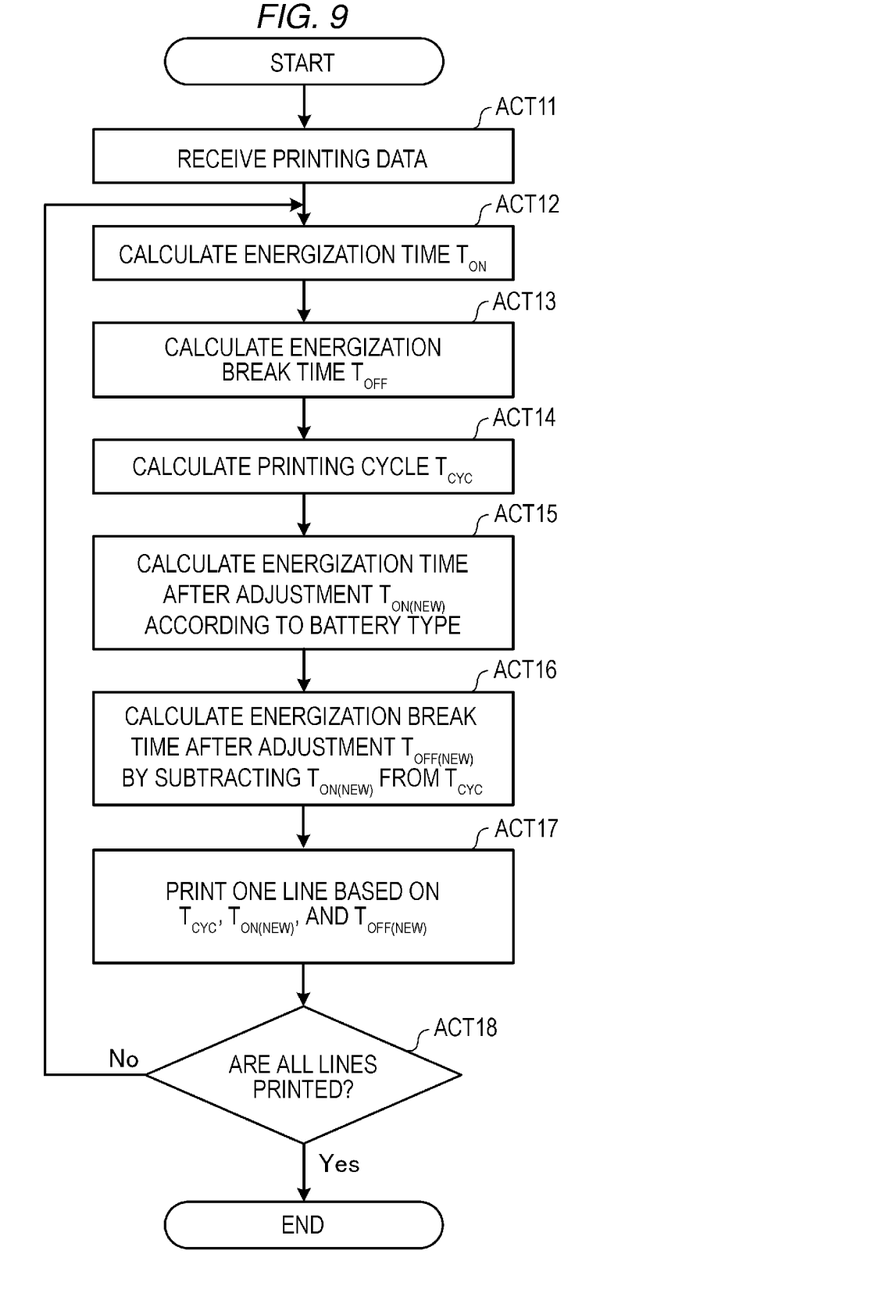
FIG. 9 is a flowchart illustrating an example of a printing control process performed by the printer.

An example of a printing control process performed by the printer 1 will be described below. FIG. 9 is a flowchart illustrating an example of the printing control process performed by the printer 1.

As a premise of the process, the setting of the battery type by the battery type specifying unit 13 is assumed to be performed in advance. The detection values are assumed to be constantly acquired by the detection result acquisition unit 12 during the process.

If the printing data receiving unit 11 receives printing data from an external device or the like (ACT 11), the printing data receiving unit 11 converts the received printing data into printing dot data for each line that can be printed by the thermal head 114.

Subsequently, the printing control unit 14 executes the process of ACTs 12 to 17 for each line of printing dot data.

First, the printing control unit 14 calculates the energization time $T_{ON}$ related to the reference battery (that is, conventional battery BTa) based on the above formula (1) (ACT 12). Next, the printing control unit 14 determines the energization break time $T_{OFF}$ related to the reference battery (that is, conventional battery BTa) based on the above formula (2) (ACT 13). Next, the printing control unit 14 calculates the printing cycle $T_{CYC}$ by adding the energization time $T_{ON}$ and the energization break time $T_{OFF}$ based on the above formula (3) (ACT 14).

Subsequently, the printing control unit 14 calculates the energization time after adjustment $T_{ON(NEW)}$ by adjusting the energization time $T_{ON}$ calculated in ACT 11, based on the above formula (4) and the coefficient corresponding to the battery type in use stored in the second setting information. Next, the printing control unit 14 calculates the energization break time $T_{OFF(NEW)}$ after adjustment by subtracting the energization time $T_{ON(NEW)}$ from the printing cycle $T_{CYC}$, based on the above formula (5) (ACT 16).

Subsequently, the printing control unit 14 controls the energization (supply of power) to the thermal head 114, based on the printing cycle $T_{CYC}$, the energization time $T_{ON\ (NEW)}$, and the energization break time $T_{OFF\ (NEW)}$ calculated in ACTs 14 to 16, thereby printing one line (ACT 17).

Subsequently, the printing control unit 14 determines whether all the lines are printed (ACT 18). Here, if an unprinted line exists (No in ACT 18), the printing control unit 14 returns the process to ACT 12. If it is determined that all the lines are printed (Yes in ACT 18), the printing control unit 14 ends the process.

As described above, the printer 1 of the embodiment calculates the printing cycle and the energization time when using the reference battery for each line based on the state of its own printer 1, and adjusts the energization time according to the characteristic difference between the internal resistance of the reference battery and the internal resistance of the battery BT in use. The printer 1 then prints one line by supplying power to the thermal head 114 during the energization time after adjustment in the calculated printing cycle.

Thus, even if the battery BT is replaced with an alternative battery having a different internal resistance from the conventional battery, the printer 1 can maintain the same printing speed as when using the conventional battery, and ensure compatibility in printing quality.

The embodiment described above can be appropriately modified and implemented by changing a part of the configuration or functions of the printer 1 described above. Therefore, hereinafter, some modifications of the embodiment described above will be described as other embodiments. In the following, points different from the embodiment described above will be mainly described, and detailed description of points common to the contents already described will be omitted. Modifications described below may be implemented individually or in combination as appropriate.

Modification 1

In the embodiment described above, the description is made on a form in which the energization time $T_{ON\ (NEW)}$ of the battery BT (alternative battery BTb) after replacement is adjusted to be approximately equal to the amount of power (hereinafter also referred to as amount of power E) if power is supplied during the energization time $T_{ON}$ using the reference battery (conventional battery BTa).

However, if the internal resistance of the alternative battery BTb is lower than that of the conventional battery BTa, since the amount of power supplied per unit time of the alternative battery BTb is greater, the energization time $T_{ON\ (NEW)}$ after adjustment is shorter than the energization time $T_{ON}$ before adjustment (see FIGS. 7 and 8). Here, since energization to the heater element 1141 by the alternative battery BTb is completed earlier, the temperature of the heater element 1141 is easily lowered until the next energization.

Therefore, if the alternative battery BTb is used, the energization time $T_{ON\ (NEW)}$ after adjustment may be derived considering the temperature drop until the next energization. Specifically, the printing control unit 14 derives the energization time $T_{ON\ (NEW)}$ after adjustment so that the amount of power (hereinafter also referred to as $E_{NEW}$) supplied by the battery BT after replacement (alternative battery BTb) becomes greater than the amount of power E.

The method of deriving the energization time $T_{ON\ (NEW)}$ after adjustment that satisfies $E < E_{NEW}$ is not particularly limited, and various methods can be employed. For example, after calculating the energization time $T_{ON\ (NEW)}$ after adjustment by the above formula (4), the printing control unit 14 may control the energization to the thermal head 114 using the energization time $T_{ON\ (NEW)}$ obtained by adding a predetermined time to the energization time $T_{ON\ (NEW)}$.

For example, the printing control unit 14 may be configured to estimate the time to be added according to the energization time $T_{ON\ (NEW)}$ (or energization break time $T_{OFF\ (NEW)}$) in the preceding line and add the estimated time to the energization time $T_{ON\ (NEW)}$ after adjustment. Accordingly, the printing control unit 14 can more reliably ensure the compatibility in printing quality.

Modification 2

In the embodiment described above, the internal resistance of the alternative battery BTb is assumed to be equal to or lower than that of the conventional battery BTa (reference battery), but is not limited thereto. A configuration may be adopted in which the internal resistance of the alternative battery BTb is allowed to be greater than the internal resistance of the conventional battery BTa (reference battery).

However, here, the time obtained by adding the energization break time $T_{OFF}$ to the energization time $T_{ON\ (NEW)}$ after adjustment exceeds the printing cycle $T_{CYC}$. Therefore, the printing control unit 14 may determine whether to print, and control the printing operation according to the determination result.

For example, the printing control unit 14 may determine whether to print based on preset setting contents if the time obtained by adding the energization break time $T_{OFF}$ to the energization time $T_{ON\ (NEW)}$ exceeds the printing cycle $T_{CYC}$. Here, when printing is to be performed, the printing control unit 14 sets the time obtained by adding the energization time $T_{ON\ (NEW)}$ to the energization break time $T_{OFF}$ as a new printing cycle $T_{CYC}$ (NEW), and prints based on the printing cycle $T_{CYC}$ (NEW). On the other hand, when printing is not to be performed, a configuration may be adopted in which the printing control unit 14 notifies the fact that printing cannot be performed and the reason thereof via the indicator 122 and the display unit 123.

For example, if the time obtained by adding the energization break time $T_{OFF}$ to the energization time $T_{ON\ (NEW)}$ and exceeds the printing cycle $T_{CYC}$, the printing control unit 14 may display a screen for checking whether to print (or whether to allow changes in the printing cycle) through the display unit 123, and determine whether to print according to the user's operation.

Thus, the printer 1 can print even if the internal resistance of the alternative battery BTb exceeds the internal resistance of the conventional battery BTa (reference battery), and thus convenience can be improved.

Modification 3

In the embodiment described above, the configuration in which printing is performed on the paper PT, which is thermal paper, is described. However, the printing method and printing medium of the printer 1 are not limited thereto. For example, the printer 1 may be a thermal transfer printer that prints on a non-thermal medium using a thermal transfer ribbon.

The program executed by the printer 1 of the embodiment described above is provided in a state of being pre-installed in a ROM, a storage unit, or the like. A configuration may be adopted in which the program executed by the printer 1 of the embodiment described above is provided by being recorded in a computer-readable recording medium such as a CD-ROM, flexible disk (FD), CD-R, digital versatile disk (DVD), and the like as a file in an installable format or executable format.

A configuration may be adopted in which the program executed by the printer 1 of the embodiment described is stored on a computer connected to a network such as the Internet, and is provided by being downloaded via the network. A configuration may be adopted in which the program executed by the printer 1 of the embodiment described above is provided or distributed via a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A printer configured to be driven by power of a battery, the printer comprising:
   a thermal head including a plurality of heating elements arranged along a direction perpendicular to a conveying direction of a recording medium;
   a drive component configured to supply power from the battery to the thermal head to drive the thermal head; and
   a processor configured to control driving of the drive component and print on the recording medium according to printing data, wherein
   the processor is configured to
     calculate, based on a state of the printer, a printing cycle related to printing of each line for the line configuring the printing data and an energization time for supplying power to the thermal head within the printing cycle when using a reference battery as a reference,
     adjust the energization time according to a characteristic difference between an internal resistance of the reference battery and an internal resistance of the battery, and
     print for one line by supplying power to the drive component during the energization time after adjustment in the printing cycle.

2. The printer according to claim 1, wherein the internal resistance of the reference battery is equal to or greater than the internal resistance of the battery.

3. The printer according to claim 1, wherein the processor is further configured to
   adjust the energization time based on a ratio between an amount of power supplied from the reference battery per unit time and an amount of power supplied from the battery per unit time.

4. The printer according to claim 1, wherein the processor is further configured to
   adjust the energization time so that an amount of power supplied from the battery is a same as the amount of power supplied from the reference battery during the energization time.

5. The printer according to claim 1, wherein the processor is further configured to
   specify a battery type of the battery, and
   adjust the energization time according to the internal resistance of the specified battery type.

6. The printer according to claim 1, wherein the processor is further configured to
   receive a designation of a battery type of the battery from a user, and
   adjust the energization time according to the internal resistance of the designated battery type.

7. The printer according to claim 1, wherein the processor is further configured to
   calculate the energization time based on a relational formula using at least one of a battery voltage of the battery, an ambient temperature of the printer, and a temperature of the thermal head as parameters.

8. The printer according to claim 7, wherein the processor is further configured to
   calculate the energization time based on the relational formula including parameters related to a printing dot pattern of each line configuring the printing data.

9. A method for a printer configured to be driven by power of a battery, the method comprising:
   calculating, based on a state of the printer, a printing cycle related to printing of each line for the line configuring the printing data and an energization time for supplying power to a thermal head within the printing cycle when using a reference battery as a reference, the thermal head including a plurality of heating elements arranged along a direction perpendicular to a conveying direction of a recording medium, and the printer comprising a drive component configured to supply power from the battery to the thermal head to drive the thermal head and a processor configured to control driving of the drive component and print on the recording medium according to printing data;
   adjusting the energization time according to a characteristic difference between an internal resistance of the reference battery and an internal resistance of the battery; and
   printing for one line by supplying power to the drive component during the energization time after adjustment in the printing cycle.

10. The method according to claim 9, further comprising:
adjusting the energization time based on a ratio between an amount of power supplied from the reference battery per unit time and an amount of power supplied from the battery per unit time.

11. The method according to claim 9, further comprising:
adjusting the energization time so that an amount of power supplied from the battery is a same as the amount of power supplied from the reference battery during the energization time.

12. The method according to claim 9, further comprising:
specifying a battery type of the battery; and
adjusting the energization time according to the internal resistance of the specified battery type.

13. The method according to claim 9, further comprising:
receiving a designation of a battery type of the battery from a user; and
adjusting the energization time according to the internal resistance of the designated battery type.

14. The method according to claim 9, further comprising:
calculating the energization time based on a relational formula using at least one of a battery voltage of the battery, an ambient temperature of the printer, and a temperature of the thermal head as parameters.

15. The method according to claim 14, further comprising:
 calculating the energization time based on the relational formula including parameters related to a printing dot pattern of each line configuring the printing data.

16. A battery powered thermal printer, comprising:
 a thermal head including a plurality of heating elements arranged along a direction perpendicular to a conveying direction of a recording medium;
 a drive component configured to supply power from the battery to the thermal head to drive the thermal head; and
 a processor configured to control driving of the drive component and print on the recording medium according to printing data, wherein
 the processor is configured to
  calculate, based on a state of the printer, a printing cycle related to printing of each line for the line configuring the printing data and an energization time for supplying power to the thermal head within the printing cycle when using a reference battery as a reference,
  adjust the energization time according to a characteristic difference between an internal resistance of the reference battery and an internal resistance of the battery, and
  print for one line by supplying power to the drive component during the energization time after adjustment in the printing cycle.

17. The battery powered thermal printer according to claim 16, wherein
 the internal resistance of the reference battery is equal to or greater than the internal resistance of the battery.

18. The battery powered thermal printer according to claim 16, wherein
 the processor is further configured to
  adjust the energization time based on a ratio between an amount of power supplied from the reference battery per unit time and an amount of power supplied from the battery per unit time.

19. The battery powered thermal printer according to claim 16, wherein
 the processor is further configured to
  adjust the energization time so that an amount of power supplied from the battery is a same as the amount of power supplied from the reference battery during the energization time.

20. The battery powered thermal printer according to claim 16, wherein
 the processor is further configured to
  specify a battery type of the battery, and
  adjust the energization time according to the internal resistance of the specified battery type.

* * * * *